United States Patent [19]
Klefbeck

[11] Patent Number: 5,658,608
[45] Date of Patent: Aug. 19, 1997

[54] DEVICE AND METHOD FOR COMPACTING, FORMING AND SEPARATING MATERIAL

[76] Inventor: Robert J. Klefbeck, 222 Heritage Rd., Suite 112, Guilderland, N.Y. 12084

[21] Appl. No.: 540,200

[22] Filed: Oct. 6, 1995

Related U.S. Application Data

[63] Continuation-in-part of Ser. No. 176,704, Jan. 3, 1994, abandoned.

[51] Int. Cl.[6] .................................................. A22C 7/00
[52] U.S. Cl. .......................... 426/512; 426/513; 426/518; 425/186; 425/190; 425/338; 425/411; 425/406; 100/289; 100/910; D7/669
[58] Field of Search ............................ 426/513, 512, 426/518; 425/338, 357, 406, 411, 443, 186, 190; D7/669, 672, 682; 100/289, 910; 452/174; 403/109, 342

[56] References Cited

U.S. PATENT DOCUMENTS

| Re. 28,106 | 8/1974 | Lee | 428/338 X |
|---|---|---|---|
| 2,219,889 | 10/1940 | Federighi et al. | 425/406 X |
| 2,837,761 | 6/1958 | Stiegler | D7/672 X |
| 2,979,775 | 4/1961 | White | 425/338 X |
| 3,262,404 | 7/1966 | Morz et al. | D7/672 X |
| 3,463,641 | 8/1969 | Berardi et al. | 426/512 X |
| 3,679,167 | 7/1972 | Jupiter et al. | D7/672 X |
| 3,775,809 | 12/1973 | Roedel | 425/338 |
| 3,943,602 | 3/1976 | Siclari | 425/338 |
| 4,604,949 | 8/1986 | Giese | 425/338 X |

FOREIGN PATENT DOCUMENTS

| 647334 | 8/1993 | Australia | 452/174 |
|---|---|---|---|
| 2235898 | 3/1991 | United Kingdom | 452/179 |

*Primary Examiner*—Milton Cano
*Attorney, Agent, or Firm*—Heslin & Rothenberg, P.C.

[57] ABSTRACT

The invention provides a device for compacting and separating material. The main components of the device are a hollow housing sealable at one end by a removable cap, a cylindrical housing having a threaded exterior for compressing material within the housing movably mounted to the other end of the hollow housing, and a plurality of separating members slidably positioned within the hollow housing. A portion of material is placed within the hollow housing, followed by a separating member, followed by another portion of material, and optionally another separating member. After the material is compressed within the hollow housing, the end is opened and the compressed portions of material are removed from the hollow housing. The compressed portions of material are maintained separated from one another by the separating members. An alignment and guidance system may be employed to maintain separating members in a level manner during operation.

19 Claims, 3 Drawing Sheets

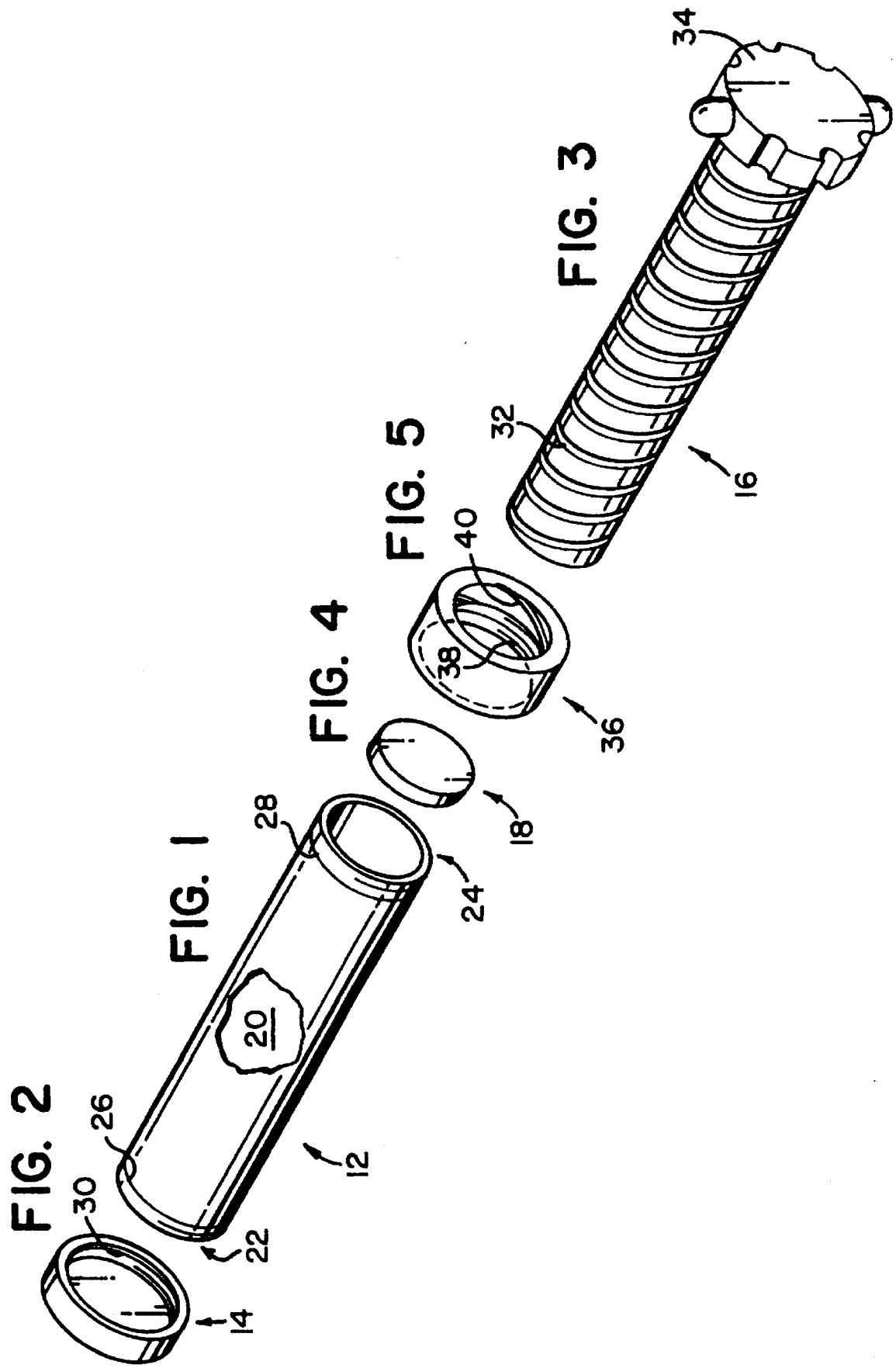

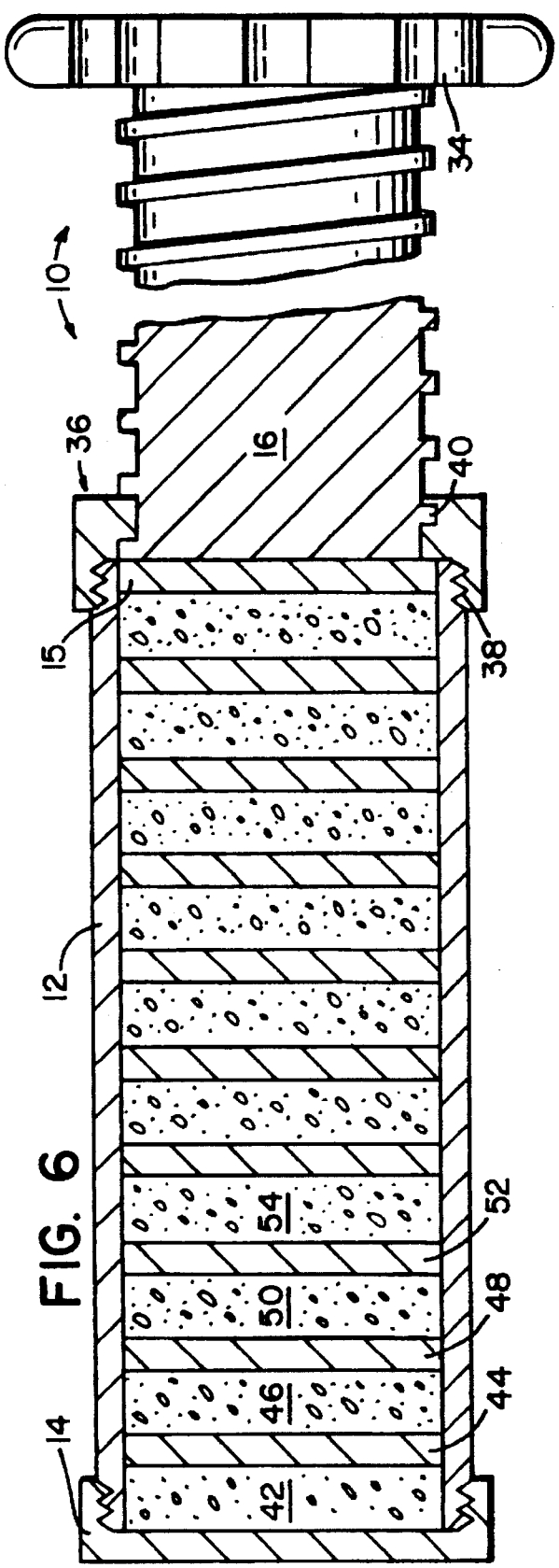
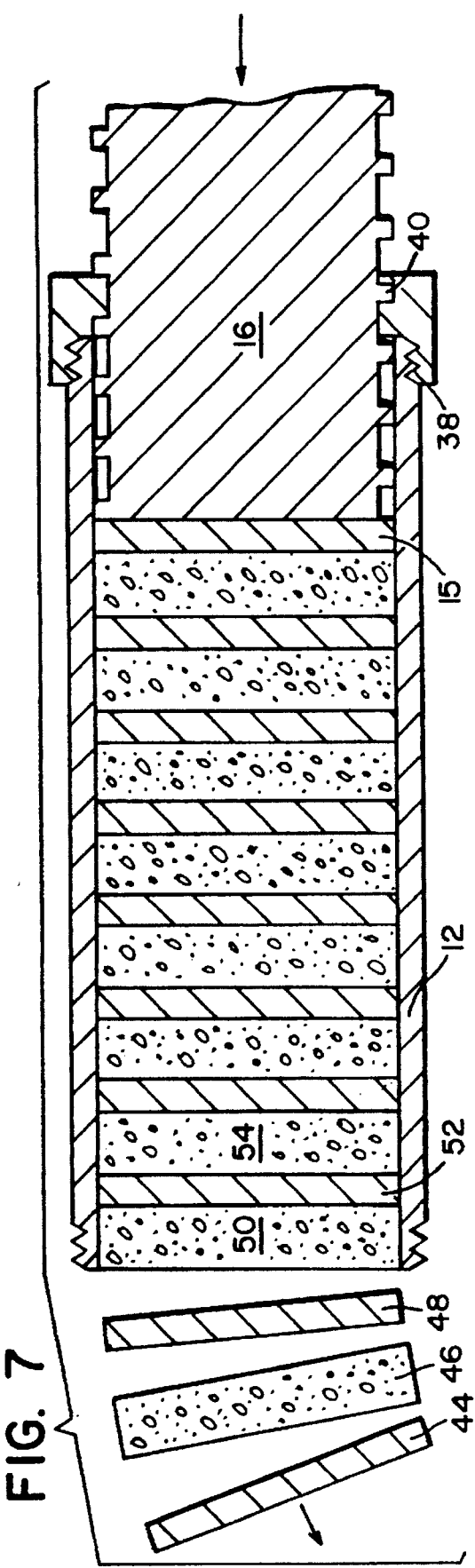

DEVICE AND METHOD FOR COMPACTING, FORMING AND SEPARATING MATERIAL

CROSS-REFERENCE TO RELATED APPLICATION

This application is a continuation-in-part of U.S. patent application Ser. No. 176,704 filed on Jan. 3, 1994, now abandoned.

FIELD OF THE INVENTION

This invention relates in general to a device for compacting and separating material, and more particularly to a press which utilizes separation members to form and separate individual portions of an edible compactable material, such as hamburger.

BACKGROUND OF THE INVENTION

Various types of devices are utilized in domestic situations to form individual portions of a compactable material. For example, cookie dough can be dispensed using a standard cookie press to form individual portions of dough. A particularly designed end is utilized to extrude the dough from the press in a particular shape. Similar presses are available for dispensing frosting onto a cake.

Hamburger presses are available which utilize a container into which hamburger is pressed to form a hamburger patty. The formed patty is then removed from the container so that another patty can be pressed, or another like container is used to press another patty. While facilitating the formation of hamburger patties, it may be desirable to have a hamburger press that can more efficiently form hamburgers, and that can form multiple hamburgers at one time. It may also be desirable for the press to provide for protection, dispensing, and/or storage of the patties.

Such a versatile press could also be utilized to form, protect, dispense, and store other types of compressible material as needed.

SUMMARY OF THE INVENTION

In furtherance of these objectives, the subject invention provides a device for compacting and separating material. The main components of the device are a hollow housing sealable at one end by a removable cap, means for compressing material within the housing movably mounted to the other end of the hollow housing, and a plurality of separating members slidably positioned within the hollow housing. A guiding and alignment system may be employed to maintain the separating members in a level manner during operation.

The separating members are utilized to form and keep separate the individual patties of material within the hollow housing. After the material is compressed into the individual patties, the end of the housing is opened and the compression means is further extended into the hollow housing. This expels the formed and separated patties, as well as the separating members, from the open end of the hollow housing.

The hollow housing can also be utilized to store formed and separated patties if the compression means is removed and replaced at that end of the hollow housing by another end cap.

BRIEF DESCRIPTION OF THE FIGURES

These and other objects, features and advantages of this invention will be evident from the following detailed description of the preferred embodiments when read in conjunction with the accompanying drawings, in which:

FIG. 1 is a partially cut-away perspective view of a hollow housing according to one embodiment of the subject invention;

FIG. 2 is a perspective view of an end cap for the hollow housing shown in FIG. 1;

FIG. 3 is a perspective view of a threaded cylindrical housing with a handle thereon which is used to compress material within the housing shown in FIG. 1;

FIG. 4 is a perspective view of a separating member which is used to separate material housed within the hollow housing shown in FIG. 1;

FIG. 5 is a perspective view of a connecting member used to movably mount the threaded cylindrical housing shown in FIG. 3 to the hollow housing shown in FIG. 1;

FIG. 6 is a cross-sectional side elevational view of a device constructed in accordance with the principles of the subject invention, having formed and separated material housed therein;

FIG. 7 is a cross-sectional side elevational view of the device shown in FIG. 6 after the end cap is removed and the threaded cylindrical housing is extended enough to begin to expel the formed and separated material from the hollow housing;

DETAILED DESCRIPTION OF THE INVENTION

Figure 8:
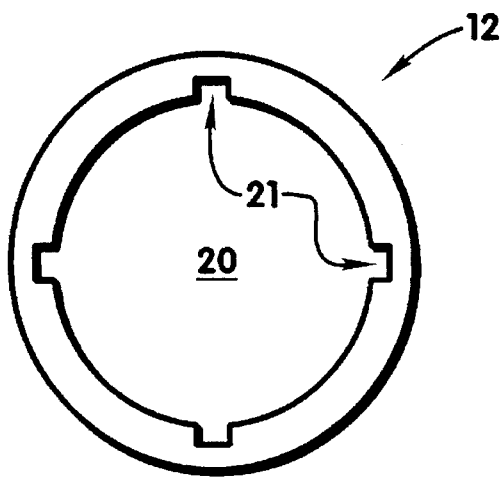
FIG. 8 is an end view of one embodiment of the hollow housing shown in FIG. 1, illustrating a plurality of channels, each channel formed longitudinally along the wall of the housing.
Figure 9:
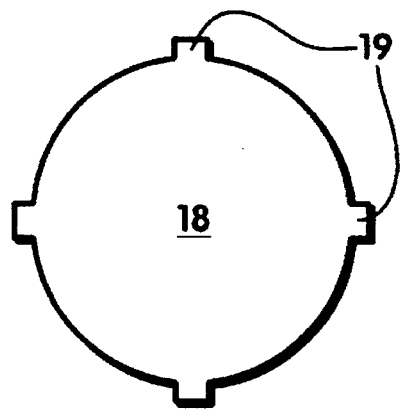
FIG. 9 is an end view of one embodiment of the separating member shown in FIG. 4 to be used in conjunction with the hollow housing of FIG. 8, illustrating a plurality of prongs spaced equally on the periphery of the separating member.

The main components of a device according to the subject invention are shown in FIGS. 1–5, in the order in which they appear. The device in its assembled form and as used is shown in FIGS. 6 and 7. FIGS. 8–11 illustrate two embodiments for a guiding system for maintaining the level compacting of material.

Referring to FIG. 1, the device includes a hollow housing 12 which is cylindrical in shape. The first end 22 of the hollow housing 12 is threaded 26, and the second end 24 is also threaded 28. The interior 20 of the hollow housing 12 is sealed at the first end 22 by a threaded end cap 14 (see FIG. 2). The threads 30 of the end cap 14 are threadable with the threads 26 on the first end 22 of the hollow housing 12.

Material is compressed within the hollow housing utilizing the cylindrical threaded housing 16 (see FIG. 3). The threaded housing 16 is movably positioned within the hollow housing 12 by use of a connecting member 36 (see FIG. 5). This connecting member 36 has two sets of threads 38 and 40. Threads 38 are threadable with threads 28 on the second end 24 of the hollow housing 12. Threads 40 are threadable with the threads 32 of the threaded housing 16. Thus, when the threaded housing 16 is turned using handle 34, threads 32 and 40 engage so that threaded housing 16 is extended into (or retracted from by turning the handle in the opposite direction) interior 20 of hollow housing 12. It should be noted that any conventional threading pattern may be selected for threads 32, including continuous threads or broken threads. Under certain circumstances, a broken thread may be preferred for reducing friction. Because a broken thread does not provide continuous thread to thread contact, friction may be reduced and overall performance improved.

Another component of the device according to the subject invention is separating member 18, which can be seen best in FIG. 4. Each of the plurality of members 18 should fit snugly within the diameter of the hollow housing, so that each separating member 18 retains its perpendicular position relative to the interior sides of the hollow housing 12 within the device during compression.

In another embodiment of the subject invention, there is an incorporated alignment and guidance system for maintaining separating members 18 in a level manner during operation. More specifically, this alignment and guidance system may keep the faces of each separating member 18 aligned perpendicular to a longitudinal axis of hollow housing 12. In one aspect, and as illustrated in FIG. 8, hollow housing 20 may be formed with a plurality of channels 21 which extend longitudinally along the length of housing 20 from first end 22 to second end 24. Preferably, housing 20 is formed with four channels 21, each spaced equally apart from one another in 90 degree relation. Separating member 18 may also include a corresponding plurality of prongs 19 (see FIG. 9) abutting outward from the periphery of each separating member 18. In a like manner to channels 21, prongs 19 should be spaced equally apart from one another in 90 degree relation so that the prongs 19 may be slidably inserted into the corresponding channels 21 of housing 12, thereby maintaining a perpendicular orientation of the faces of separating member 18 to the longitudinal axis of housing 12, but at the same time facilitating the slidable engagement and movement of separating member within housing 12.

Figure 10:
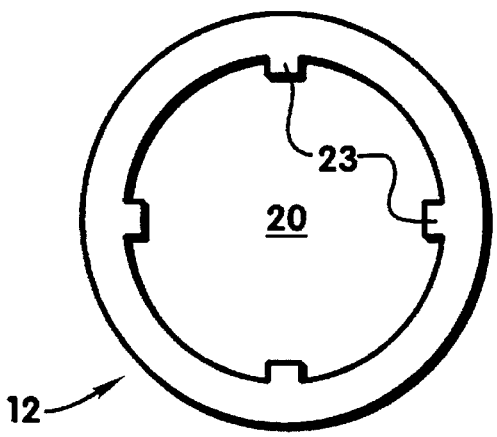
FIG. 10 is an end view of another embodiment of the hollow housing shown in FIG. 1, illustrating a plurality of ribs formed longitudinally along the wall of the hollow housing.
Figure 11:
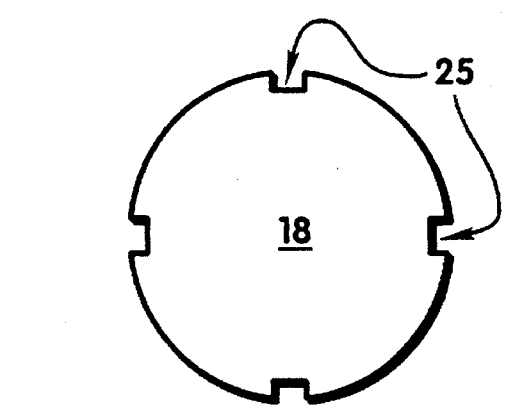
FIG. 11 is an end view of another embodiment of the separating member shown in FIG. 4 to be employed in conjunction with the hollow housing of FIG. 10, illustrating a plurality of notches formed along the periphery of the separating member.

As illustrated in FIGS. 10 and 11, in another aspect, hollow housing 12 may alternatively include a plurality of ribs 23 which are formed along the length of the inner wall of hollow housing 12 from first end 22 to second end 24. Correspondingly, each separating member 18 may include a plurality of notches 25 for slidable engagement to ribs 23 of hollow housing 12.

As can be seen in the drawings, channels 21, prongs 19, ribs 23 and notches 25 are all square-shaped and spaced in 90 degree relation to one another. It should be noted, however, that any geometric shape may be selected, so long as it facilitates alignment and levelling as described herein. For example, a triangular or a circular configuration may be appropriate for the alignment elements. Also, the spacing and the number of channels 21, prongs 19, ribs 23 and notches 25 is not limited to four, and any other variations exist.

Referring back to FIG. 6, device 10 is shown in use. The end cap 14 is threaded to the hollow housing 12. The connecting member 36 is threaded to the other end of the hollow housing at threads 38, and the threaded housing 16 is threaded to the connecting member 36 at threads 40. By turning the handle 34 of the threaded housing 16, the threaded housing 16 extends into the interior 20 of the hollow housing 12. The handle 34 allows a user of the device to apply more torque when turning the threaded housing 16, which may assist in compressing the material within hollow housing 12.

Positioned within the hollow housing 12 are several portions of compactable material, i.e., compactable portions 42, 46, 50 and 54. These portions are separated from one another by separating members, i.e., 44, 48 and 52. Prior to insertion of the threaded housing 16 into the hollow housing 12, the first portion 42 of material was placed within the interior 20 of the hollow housing 12 through the open second end 24. The first end 22 of the hollow housing had already been sealed by end cap 14. After placing the first portion 42 of material in the interior 20 of the hollow housing 12, the first separating member 44 was placed within the interior 20 over the first portion 42. Then the second portion 46 of material, followed by the second separating member 48, the third portion 50 of material, the third separating member 52, the fourth portion 54 of material, and so forth were placed within the interior 20 of the hollow housing 12, consecutively. An optional final separating member 15 was placed within the interior 20 of the hollow housing 12. This separating member 15 provides for a cleaner expulsion of material from the hollow housing 12, with minimal material contacting the threads 32 of the threaded housing 16. If the alignment and guidance system as described above is employed, greater stability and levelling of separating members 18 may be achieved.

The threaded housing 16 was then threaded to the connecting member 36 at threads 40 and threaded to extend further and further into the interior 20 of the hollow housing 12. The threaded housing 16 was extended until the portions of material, i.e., 42, 46, 50 and 54, were sufficiently compressed into individual patties. Then, the end cap 14 was removed, and the threaded housing 16 was extended further (see FIG. 7). As the threaded housing 16 was extended further, the individual separated portions of material began to be expelled from the hollow housing 12. The first portion 42 comes out as an individually formed, compacted, separated portion of material. The first portion 42 is separated from the second portion 46 (also an individually formed, compacted, separated portion of material) by the first separating member 44. Likewise, portions 46, 50 and 54 are separated by separating members 48 and 52, respectively.

When the threaded housing 16 is fully threaded into the hollow housing, all portions of material are expelled from the interior of the hollow housing for use. The device can thus provide a continuous flow of edible material like hamburgers, limited only by the number of portions and separating members placed within the housing. A device capable of holding and forming at least ten to twelve compacted portions is preferable.

It is also possible to compress the material within the sealed hollow housing 12, then to remove the threaded housing 16. This is most easily done by removing the connecting member 36 (with the threaded housing still threaded thereto). Otherwise, the threaded housing 16 needs to be turned all the way back out of the hollow housing 12. A second end cap (not shown) can then be placed over the remaining open end 24 of the hollow housing 12. This second end cap can be threaded to the threads 28 on the end of the housing, now exposed due to removal of the connecting member. The sealed housing can then be stored wherever desired, such as in a freezer or refrigerator, or a cooler for a picnic. When the material is needed, the second end cap is removed and the threaded housing 16 is inserted to expel the contents housed within the interior 20 of the hollow housing 12.

The device according to this invention can be utilized to compact and separate any compressible material as desired. It should be readily apparent that preferred compactable materials are hamburger, sausage, or any other foods which may be formed into patties. The device offers the ability to shape, store, protect, and dispense individual patties of such materials in a quick and easy manner. The device also allows for the dispensing of the individual patties directly onto a grill or into a pan, if desired.

The invention thus provides a device for compacting and separating portions of compactable material while eliminating the need for hazardous blades and cutting edges. The device is capable of varying degrees of compacting and can provide varying sizes of formed patties based on the amount of the portion of compactable material placed within the device.

The components of the device can be formed of any suitable materials, including plastic or metal (i.e., stainless steel).

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined by the following claims.

What is claimed is:

1. A device for compacting and separating edible material which comprises:
    a hollow housing having a first open end, a second open end, and an interior thereof;
    a removable cap engageable to said first open end of said hollow housing for sealing said first open end;
    a cylindrical housing having a threaded exterior for compressing said edible material within said interior of said hollow housing, said cylindrical housing threadably engageable to said hollow housing for moving said cylindrical housing within the interior of said hollow housing; and
    a plurality of separating members slidably positionable within said interior of said hollow housing, wherein when said plurality of separating members are positioned within said interior of said hollow housing spaced apart from one another, said interior of said hollow housing is separated into individual sealed compartments;
    wherein said hollow housing and each of said plurality of separating members both include means for facilitating alignment to one another such that a central axis of each of said plurality of separating members when positioned within the interior of said hollow housing is maintained in a substantially perpendicular relationship to a longitudinal axis of said hollow housing.

2. The device of claim 1 wherein said first open end of said hollow housing is threaded and said removable cap is threaded, said hollow housing and said removable cap being threadable to one another.

3. The device of claim 1 wherein said hollow housing is cylindrical.

4. The device of claim 3 wherein each of said plurality of separating members are disc-shaped for insertion into the interior of said cylindrical hollow housing.

5. The device of claim 1 wherein said threaded exterior comprises a broken thread pattern.

6. The device of claim 1 wherein said second end of said hollow housing is threaded and said cylindrical housing is threadable therewith.

7. The device of claim 1 wherein said second end of said hollow housing is threaded.

8. The device of claim 7 further comprising a connecting member, said connecting member having a first threaded end threadable with said second end of said hollow housing and a second threaded end threadable with said cylindrical housing.

9. A device for compacting and separating edible material which comprises:
    a cylindrical hollow housing having a first open end, a second open end, and a wall defining an interior thereof;
    a removable cap mountable to said first open end of said hollow housing for sealing said first open end;
    means for compressing material within said interior of said hollow housing, said means movably mounted to said second open end of said hollow housing;
    a plurality of disc-shaped separating members slidably positionable within said interior of said hollow housing, wherein when said plurality of separating members are positioned within said interior of said hollow housing spaced apart from one another, said interior of said hollow housing is separated into individual sealed compartment; and
    wherein said hollow housing and each of said plurality of separating members both include means for facilitating alignment to one another such that a central axis of each of said plurality of separating members when positioned within the interior of said hollow housing is maintained in a substantially perpendicular relationship to a longitudinal axis of said hollow housing.

10. The device of claim 9 wherein said alignment means of said hollow housing comprises a plurality of channels formed along the wall defining the interior of said hollow housing, said plurality of channels extending from said first open end to said second open end.

11. The device of claim 10 wherein said alignment means of each of said plurality of separating members includes a plurality of prongs formed on a periphery thereof, said plurality of prongs being configured for slidable engagement to said plurality of channels of said hollow housing.

12. The device of claim 11 wherein said plurality of prongs are formed equally spaced in 90 degree relation to one another on the periphery of each of said plurality of separating members.

13. The device of claim 10 wherein said plurality of channels are formed equally spaced in 90 degree relation to one another on said interior wall of said hollow housing.

14. A method of compacting and separating edible material comprising:
    selecting a hollow housing having a first open end, a second open end, and a wall defining an interior thereof;
    sealing said first open end of said hollow housing;
    placing a first portion of edible material within the interior of said hollow housing through said second open end;
    aligning a separating member having means for alignment with corresponding means for aligning within the interior of said hollow housing through said second open end and over said first portion such that said separating member when positioned within the interior of said hollow housing is maintained in a substantially perpendicular relationship to a longitudinal axis of said hollow housing;
    placing a second portion of edible material within the interior of said hollow housing through said second open end and over said first separating member;

simultaneously compressing said first portion and said second portion within said interior of said hollow housing, the compressed first portion being separated from the compressed second portion by said separating member;

unsealing said first open end of said hollow housing; and removing said compressed first portion and said compressed second portion from said interior of said hollow housing through said first open end.

15. The method of claim 14 further comprising placing a second separating member within the interior of said hollow housing through said second open end and over said second portion.

16. The method of claim 14 wherein said sealing comprises threading a cap to said first open end.

17. The method of claim 14 wherein said compressing comprises forcing a member whose shape approximates the shape of the interior of the hollow housing into said interior through said second open end, thereby pressing said second portion against said separating member against said first portion against said sealed first open end.

18. The method of claim 17 wherein said removing comprises forcing said member to the first open end of said hollow housing, thereby expelling said compressed first portion, said separating member, and said compressed second portion from the interior of said hollow housing.

19. A method of compacting and separating edible material comprising:

selecting a hollow housing having a first open end, a second open end, and a wall defining an interior thereof;

sealing said first open end of said hollow housing;

placing a first portion of compactable material within the interior of said hollow housing through said second open end;

placing a separating member having a plurality of prongs within the interior of said hollow housing through said second open end and over said first portion and aligning said plurality of prongs with a plurality of corresponding channels formed in said wall of said hollow housing;

placing a second portion of compactable material within the interior of said hollow housing through said second open end and over said first separating member;

compressing said first portion and said second portion within said interior of said hollow housing, the compressed first portion being separated from the compressed second portion by said separating member;

unsealing said first open end of said hollow housing; and removing said compressed first portion and said compressed second portion from said interior of said hollow housing through said first open end.

* * * * *